United States Patent
Hou et al.

(10) Patent No.: US 12,073,405 B2
(45) Date of Patent: Aug. 27, 2024

(54) BACKEND ARCHITECTURE METHOD AND SYSTEM FOR AGGREGATE PAYMENT, COMPUTER DEVICE, AND STORAGE MEDIUM

(71) Applicant: BIGO TECHNOLOGY PTE. LTD., Singapore (SG)

(72) Inventors: Juncheng Hou, Guangzhou (CN); Kaixing Yang, Guangzhou (CN)

(73) Assignee: BIGO TECHNOLOGY PTE. LTD., Singapore (SG)

( * ) Notice: Subject to any disclaimer, the term of this patent is extended or adjusted under 35 U.S.C. 154(b) by 38 days.

(21) Appl. No.: 17/419,613

(22) PCT Filed: Nov. 20, 2019

(86) PCT No.: PCT/CN2019/119788
§ 371 (c)(1),
(2) Date: Jun. 29, 2021

(87) PCT Pub. No.: WO2020/134738
PCT Pub. Date: Jul. 2, 2020

(65) Prior Publication Data
US 2022/0084031 A1    Mar. 17, 2022

(30) Foreign Application Priority Data
Dec. 29, 2018  (CN) .......................... 201811638611.3

(51) Int. Cl.
  *G06Q 40/00*    (2023.01)
  *G06Q 20/40*    (2012.01)
(52) U.S. Cl.
  CPC ..... *G06Q 20/4015* (2020.05); *G06Q 20/4014* (2013.01); *G06Q 20/405* (2013.01)

(58) Field of Classification Search
  CPC .......... G06Q 20/4015; G06Q 20/4014; G06Q 20/405
  (Continued)

(56) References Cited

U.S. PATENT DOCUMENTS

2009/0158246 A1*  6/2009  Sifter .................. G06F 8/20
                                                         717/104
2011/0004554 A1*  1/2011  Knight ................ G06Q 20/042
                                                         705/45

(Continued)

FOREIGN PATENT DOCUMENTS

CN       1417731 A         5/2003
CN       103186853     *  10/2013   ............. G06Q 20/16

(Continued)

OTHER PUBLICATIONS

Xie et al., "Understanding the adoption of third-party online payment—An empirical study of user acceptance of Alipay in China," Jonkoping International Business School, Jonkoping University, Master's Thesis, 2014 (Year: 2014).*

(Continued)

*Primary Examiner* — Abhishek Vyas
*Assistant Examiner* — William B. Bunker
(74) *Attorney, Agent, or Firm* — Kolitch Romano Dascenzo Gates LLC

(57) ABSTRACT

A backend architecture method includes: acquiring transaction information from a client, wherein the transaction information includes location information of the client; assigning, based on the location information, the transaction information to a transaction node that has jurisdiction over the location information, wherein the transaction node is a transaction center within a specified region in a distributed transaction system; matching, according to the transaction node, a channel gateway in a channel docking layer that (Continued)

pre-establishes a connection relationship with the transaction node, and sending a transaction request in the transaction information to a transaction object over the matched channel gateway such that the transaction object processes the transaction request; and acquiring a processing result from the transaction object, and transmitting information of the processing result to the client.

20 Claims, 8 Drawing Sheets

(58) Field of Classification Search
USPC .......................................................... 705/39
See application file for complete search history.

(56) References Cited

U.S. PATENT DOCUMENTS

| | | | | |
|---|---|---|---|---|
| 2013/0046655 | A1* | 2/2013 | Karkera | G06Q 30/06 |
| | | | | 705/26.41 |
| 2014/0156512 | A1* | 6/2014 | Rahman | G06Q 20/326 |
| | | | | 705/39 |
| 2015/0134514 | A1* | 5/2015 | Chan | G06Q 20/108 |
| | | | | 705/39 |
| 2020/0034823 | A1* | 1/2020 | Rollings | G06Q 20/34 |
| 2020/0186568 | A1* | 6/2020 | Erb | H04L 9/0841 |

FOREIGN PATENT DOCUMENTS

| | | | | |
|---|---|---|---|---|
| CN | 103489095 | A | 1/2014 | |
| CN | 104408584 | A | 3/2015 | |
| CN | 105427101 | A | 3/2016 | |
| CN | 105474244 | A | 4/2016 | |
| CN | 106779649 | A | 5/2017 | |
| CN | 106779649 | A * | 5/2017 | .......... G06Q 20/108 |
| CN | 106779666 | A | 5/2017 | |
| CN | 106875190 | * | 6/2017 | ............ G06Q 20/40 |
| CN | 107146077 | * | 9/2017 | ............ G06Q 20/02 |
| CN | 107833052 | A | 3/2018 | |
| CN | 106779649 | * | 4/2021 | ............ G06Q 20/10 |
| CN | 109191089 | * | 5/2021 | ............ G06Q 20/02 |
| JP | 2004234586 | A | 8/2004 | |
| WO | WO-0161663 | A2 * | 8/2001 | ............ G06Q 20/04 |
| WO | WO-2009107102 | A2 * | 9/2009 | .......... G06Q 20/223 |

OTHER PUBLICATIONS

Unknown, "Enterprise Payment Gateway," an IP.com publication, IPCOM000198378D, 2010 (Year: 2010).*
International Search Report of the International Searching Authority for State Intellectual Property Office of the People's Republic of China in PCT application No. PCT/CN2019/119788 issued on Feb. 26, 2020, which is an international application corresponding to this U.S. application.
The State Intellectual Property Office of People's Republic of China, First Office Action in Patent Application No. CN201811638611.3 i issued on Aug. 20, 2020, which is a foreign counterpart application corresponding to this U.S. Patent Application, to which this application claims priority.
Notification to Grant Patent Right for Invention of Chinese Application No. 201811638611.3 issued on Nov. 18, 2020.
Yunan Xia, Convergent payment risk analysis and supervision recommendations, Fintech era, Feb. 28, 2018.

* cited by examiner

BACKEND ARCHITECTURE METHOD AND SYSTEM FOR AGGREGATE PAYMENT, COMPUTER DEVICE, AND STORAGE MEDIUM

CROSS-REFERENCE TO RELATED APPLICATIONS

This application is a US national stage of international application No. PCT/CN2019/119788, filed on Nov. 20, 2019, which claims priority to Chinese Patent Application No. 201811638611.3, filed on Dec. 29, 2018 and entitled "AGGREGATED PAYMENT BACKGROUND ARCHITECTURE METHOD AND SYSTEM, COMPUTER EQUIPMENT AND STORAGE MEDIUM". Both applications are herein incorporated by reference in their entireties.

TECHNICAL FIELD

The present disclosure relates to the technical field of computer application, and in particular, relates to a backend architecture method and system for aggregate payment, a computer device, and a storage medium.

BACKGROUND

With the rapid development of the Internet of things and the Mobile Internet, the electronic payment industry has also been developing rapidly in recent years. Domestically, banks, UnionPay and other clearinghouses, third-party payment companies, and the like provide different types of mobile payment services implemented with different technologies. Moreover, due to the objective demand, the electronic payment technology has been applied in various fields. However, under this context, no unified standard and interface are provided for services from various parties, such that it is difficult to achieve compatibility between various payment tools and platforms. Globally, each country has its own channel providers and access control rules. For merchants with global businesses, the access cost and access efficiency are also greatly affected.

Only a few third-party payment channels are used in China. Generally, more than 90% of domestic online payment transactions can be covered by accessing WeChat or Alipay for merchants. Therefore, when accessing payment channels, most merchants are directly connected to third-party channels. However, payment processes over various payment channels (such as WeChat and Alipay) differ in detail, such that a plurality of sets of payment processes generally need to be supported at the backend. The domestic Internet industry is on the way to going abroad. There are many different payment channels with different processes overseas. If merchants directly connect to third-party payment channels using the conventional method, the merchants need to handle the complex task of maintaining the plurality of sets of payment processes.

SUMMARY

The present disclosure provides a backend architecture method and system for aggregate payment, a computer device, and a storage medium, to solve at least one of the aforementioned technical defects. The present disclosure can achieve high isolation, low node coupling, fast access, and high practicability and flexibility in a third-party payment process.

To achieve the above objective, the present disclosure provides a backend architecture method for aggregate payment. The method includes: acquiring transaction information from a client, wherein the transaction information includes location information of the client; assigning, based on the location information, the transaction information to a transaction node that has jurisdiction over the location information, wherein the transaction node is a transaction center within a specified region in a distributed transaction system; matching, according to the transaction node, a channel gateway in a channel docking layer that pre-establishes a connection relationship with the transaction node, and sending a transaction request in the transaction information to a transaction object over the matched channel gateway such that the transaction object processes the transaction request; and acquiring a processing result from the transaction object, and transmitting information of the processing result to the client.

According to another aspect, the present disclosure provides a backend architecture system for aggregate payment. The system includes: an access frontend, configured to acquire transaction information from a client, wherein the transaction information includes location information of the client; a relay server, configured to assign, based on the location information, the transaction information to a transaction node that has jurisdiction over the location information, wherein the transaction node is a transaction center within a specified region in a distributed transaction system; and a transaction node, configured to match, according to the transaction node, a channel gateway in a channel docking layer that pre-establishes a connection relationship with the transaction node, send a transaction request in the transaction information to a transaction object over the matched channel gateway such that the transaction object processes the transaction request, acquire a processing result from the transaction object, and transmit information of the processing result the client.

According to another aspect, the present disclosure provides a computer device. The computer device includes a memory and a processor. The memory stores at least one computer-readable instruction. The processor, when executing at least one computer-readable instruction, is caused to perform the backend architecture method for aggregate payment as described above.

According to another aspect, the present disclosure provides a non-transitory storage medium storing at least one computer-readable instruction. The least one computer-readable instruction, when executed by one or more processors, causes the one or more processors to perform the backend architecture method for aggregate payment as described above.

The present disclosure achieves the following beneficial effects.

Based on the location information of the client in the transaction information, distributed processing is performed, such that data processing for payment is faster. Moreover, transaction centers deployed in a distributed fashion are independent of each other and use unified communication interfaces to connect with transaction objects, which shield differences in details of the payment processes of different channels, and provide a universal and unified payment access process for the clients. Therefore, to use all payment channels supported by the payment architecture, a merchant on the client side only needs to maintain one set of processes for interacting with the aggregate payment architecture, thus achieving strong data isolation, low node coupling, strong anti-attack capability, and low service coupling between clients. The aggregate payment architecture is more suitable for distributed deployment, and has high system availability, and strong disaster tolerance. The unified scheduling interface makes the system highly expandable and reduces impact of functional iteration on online services.

BRIEF DESCRIPTION OF THE DRAWINGS

The foregoing and/or additional aspects of the present disclosure and advantages of the present disclosure can become apparent and readily understandable from the following descriptions of the embodiments with reference to the accompanying drawings.

DETAILED DESCRIPTION

Figure 1:
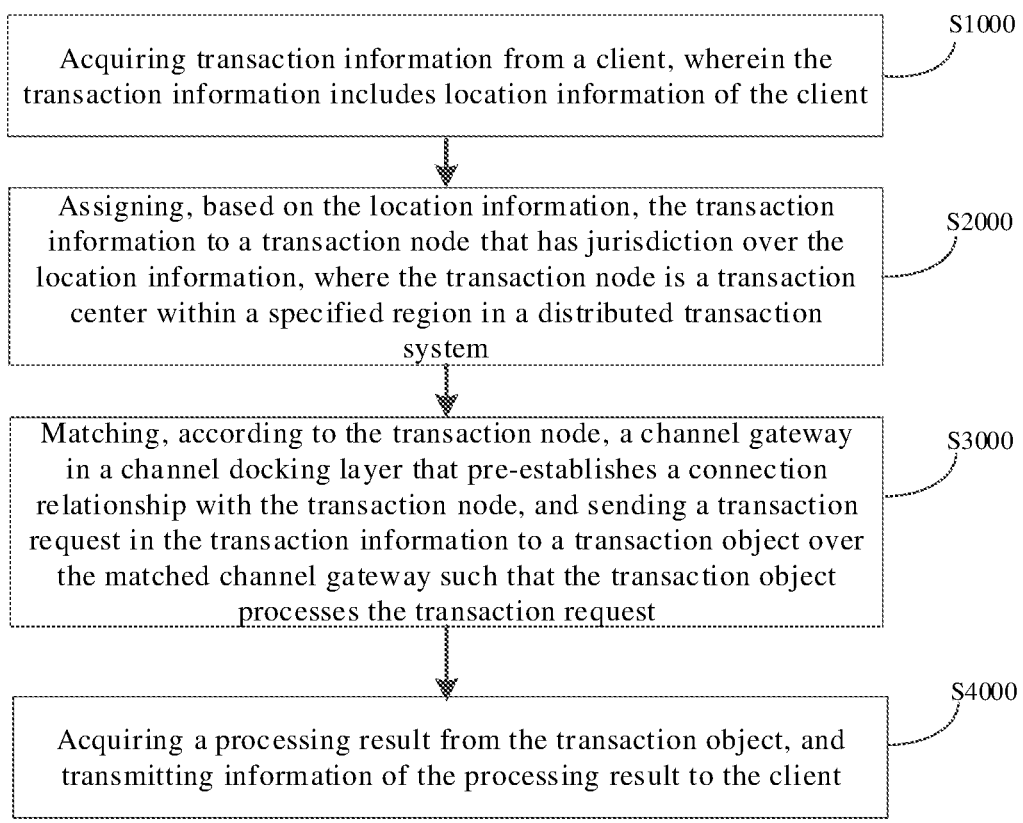
FIG. 1 is a flowchart of a backend architecture method for aggregate payment according to the present disclosure.

Specifically, referring to FIG. 1, a backend architecture method for aggregate payment is provided in the present disclosure. Aggregate payment is a term relative to the term, third-party payment. Unlike third-party payment, aggregate payment does not lie between merchants and banks, but serves as a channel between merchants and third-party payers. Aggregate payment does not involve settlement or transfer of funds, but merely performs the control of information flows and data flows in the payment link, and aggregates payment methods provided by different third-party payment institutions, to provide merchants with a unified interface for payment and settlement. Aggregate payment reduces the access difficulty and cost for merchants, improves the speed and efficiency of operation, and achieves better flexibility and convenience.

In the present disclosure, the backend architecture method for aggregate payment includes the following processes:

In S1000, transaction information from a client is acquired, wherein the transaction information includes location information of the client.

The client refers to a merchant terminal. There are a plurality of clients, and the clients are capable of sending request instructions at the same time for analysis. A request instruction is a related data message that records identity information of a client and request content. The data message is a field combination in an agreed format to facilitate information interaction. In order to distinguish different clients, the data message includes merchant number information that characterizes the identity of the client and service number information that characterizes a service type of the request, and thus the identity information of the client sending the request and the request content can be confirmed.

The transaction information is related information that is sent by the client and that the client requests to be processed by a third party. The transaction information includes location information of the client.

In another embodiment, the transaction information further includes location information of a transaction object to which the transaction information is directed. In the present disclosure, the transaction object is a third party requested by the transaction client to perform transaction processing, and the location information of the transaction object herein refers to location information of the third party. It may be understood that the third party is a payment platform. There are many payment platforms, such as famous banks, WeChat, Alipay and other financial platforms. These third-party platforms have corresponding server location information. The location information includes nationality and a specific region. By acquiring the location information of the transaction object, server location information of the transaction object can be acquired.

In S2000, the transaction information is assigned, based on the location information, to a transaction node that has jurisdiction over the location information, wherein the transaction node is a transaction center within a specified region in a distributed transaction system.

The transaction node is deployed in a core processing layer performing service processing. Creation of service orders and service processing logics are achieved at the core processing layer. In one embodiment, the location information is the location information of the client, and the transaction node is a transaction center within a specified region in the distributed transaction system. Since the clients may be distributed in various locations around the world, for quick responses to payment requests, a transaction node may be configured in any place around the world. Based on the acquired location information of the client, a transaction node having jurisdiction over the location information is selected for processing.

In another embodiment, the location information is the location information of the transaction object to which the transaction information is directed, i.e., the location information of the third-party transaction platform. The third-party transaction platform may be deployed at various locations around the world, and the aggregate payment clients of the present disclosure may also be distributed around the world. Therefore, in order to achieve rapid response to the payment request, a plurality of transaction nodes can be configured based on regional locations of the third-party transaction platform. The transaction nodes are independent and isolated from each other. When one of the transaction nodes is abnormal, normal service processing of other transaction nodes is not affected. Further, each transaction node has its own jurisdiction. A new request instruction can be assigned to a transaction node having corresponding jurisdiction for processing, by identifying location information of a transaction object and a service type that correspond to the new request instruction. However, in order to further improve the disaster tolerance of service processing, whether the corresponding transaction node is in an available state when the request instruction is assigned to the corresponding transaction node is determined. When the transaction node is determined to be in an unavailable state, the request instruction is assigned to another available transaction node to ensure the normal processing of the request instruction of the transaction information.

In S3000, a channel gateway is matched, according to the transaction node, in a channel docking layer that pre-establishes a connection relationship with the transaction node, and a transaction request in the transaction information is sent to a transaction object over the matched channel gateway such that the transaction object processes the transaction request.

Once the transaction information is assigned to the transaction node, a channel gateway is matched, according to information of the transaction node, in a channel docking layer that has established a connection relationship with the transaction node. A plurality of different channel gateways are stored in the channel docking layer, and different channel gateways are connected to and communicate with different third-party transaction objects.

The channel gateways are connected to and communicate with transaction nodes by scheduling interfaces. In the present disclosure, the channel gateways can achieve the logic for interacting with the third-party transaction objects, and interaction details between different channels are shielded from an upstream node. In the present disclosure, the scheduling interfaces of the channel gateways are unified, to maintain a consistent transaction process that does not change due to changes of channel objects. Further, each channel in the channel gateway layer is logically independent and does not manipulate order data. Changes in one channel have little impact on other channels and the main process, such that fast access and iteration can be achieved. The unified scheduling interface also facilitate access to a new channel. The new channel can be accessed by simply building a corresponding channel gateway node. Specific differences and details of the interaction with a third-party transaction object are concealed in the channel gateway.

In the service process of payment, the channel gateways are application interfaces connecting to different third-party payment platforms. Different third-party payment platforms require different channel gateways, thus forming a channel gateway connection library, i.e., the channel docking layer. By identifying transaction objects in request instructions, different channel gateways can be matched from the channel gateway connection library for service processing.

In an embodiment, each channel gateway interacts with a third-party channel using a unified scheduling interface, interaction details between different channels are shielded from an upstream node, and the connection of each channel forms an independent sub-module. Therefore, when relevant service processing needs to be performed, a corresponding interface can be called directly. When a new channel is accessed, it is only necessary to build a channel gateway node that provides a standard and unified interface. Specific differences and details of docking with the third party are concealed in the channel gateway. In this way, an upper core service layer can call a unified interface and maintain a consistent transaction process that does not change with changes in channels; and further, each channel in the channel gateway layer is logically independent and does not manipulate order data. Changes in one channel have little impact on other channels and the main process, thereby achieving rapid access and iteration.

In S4000, a processing result from the transaction object is acquired, and information of the processing result is transmitted to the client.

In the present disclosure, when the transaction request in the transaction information is sent to the corresponding transaction object such that the transaction object processes the transaction request by calling the corresponding communication interface, the transaction result returned by the transaction object is acquired, and information of the transaction result is sent back to the client.

In the present disclosure, the data reception and assignment in processes S1000 and S2000 are performed in a service access layer. The service access layer includes an access frontend and a relay server. The access frontend receives the transaction information from the client, converts the transaction information into a protocol format recognizable by the backend, and completes tasks such as identity verification, authorization control, and traffic isolation. Afterwards, the relay server performs load balancing and task assignment, and sends, based on a distribution policy, the request information in the transaction information to a specified transaction node for processing. Transaction information monitoring and result information collection are performed by a payment node by calling a communication interface, wherein the payment node belongs to the core service layer. The channel gateways and the unified scheduling interfaces belong to the channel docking layer. The core service layer mainly includes a payment center, payment notification module and asynchronous retry module, payment monitoring module, and the like. The payment center completes the management and recording of payment orders, and calls services of the channel gateways in the next layer. The asynchronous retry module is responsible for the replay of asynchronous tasks to ensure the completion of orders. The payment monitoring module is responsible for the monitoring and statistics of payment orders. The payment notification module is responsible for asynchronous notification to the client in response to the order being completed. The channel docking layer is mainly responsible for connection with services provided by the third-party objects. The connection of each channel forms an independent sub-module, which facilitates channel management and rapid iteration.

In the present disclosure, distributed processing is performed based on the location information of the transaction object in the transaction information, such that data processing for payment is faster. Moreover, transaction centers deployed in a distributed fashion are independent of each other and use unified communication interfaces to connect with transaction objects, to shield differences in details of the payment processes in different channels. Therefore, a universal and unified payment access process is provided for the clients. To use all payment channels supported by the payment architecture, a merchant on the client side only needs to maintain one set of processes for interacting with the aggregate payment architecture, thus achieving strong data isolation, low node coupling, strong anti-attack capability, and low service coupling between clients. The aggregate payment architecture is more suitable for distributed deployment, and has high system availability and strong disaster tolerance. The unified scheduling interface makes the system highly expandable and reduces the impact of the functional iteration on online services.

Figure 2:
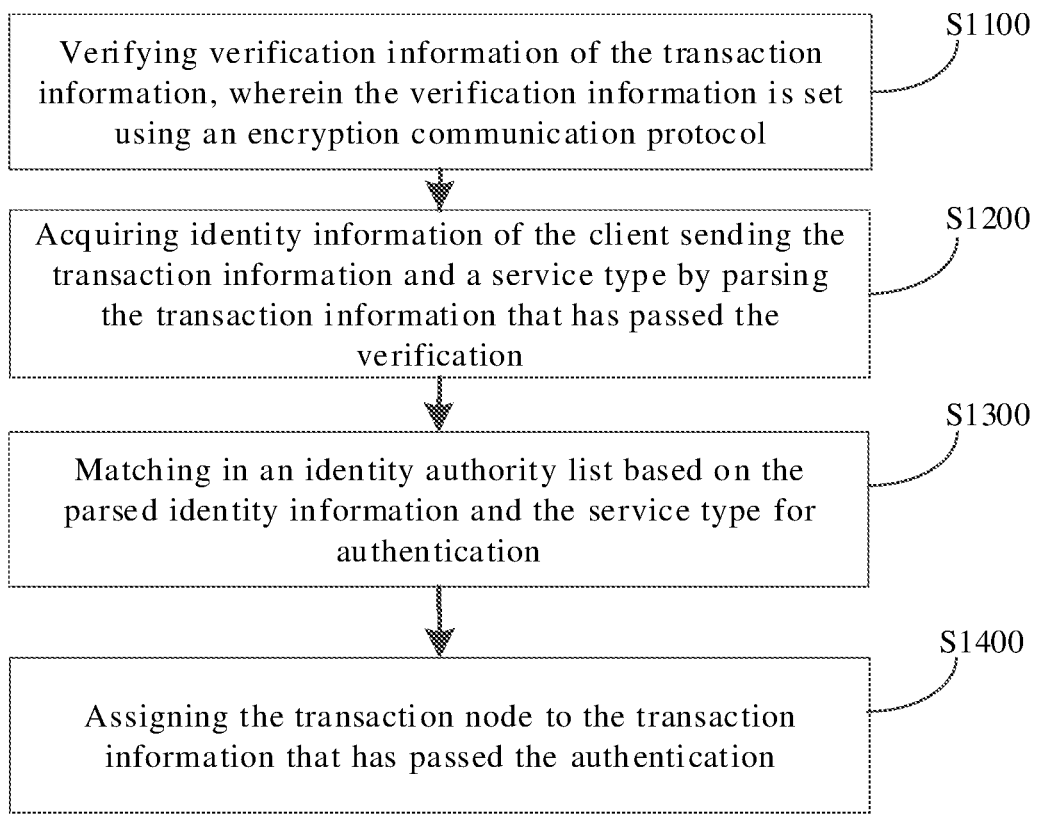
FIG. 2 is a flowchart of a method for authenticating transaction information according to the present disclosure.

In an embodiment, referring to FIG. 2, in response to acquiring transaction information from a client and before assigning, based on the location information, the transaction information to a transaction node that has jurisdiction over the location information, the method further includes the following processes.

In S1100, verification information of the transaction information is verified, wherein the verification information is set using an encryption communication protocol.

In the present disclosure, the transaction information sent by the client is provided with verification information using an encryption communication protocol, to ensure that the communication is not tampered with by a third party. In response to receiving the transaction information, the access frontend verifies the verification information. During data interaction, the client and the access frontend adopt a uniform information verification method, such as encrypting data using a public key and a private key. In response to receiving the data, the access frontend decrypts the data on the basis of the rule predetermined by the client and the access frontend, thereby ensuring that the data is not easily tampered with in the process of data interaction between the client and the access frontend, and making data transmission more secure.

Further, as the forefront of service reception, the access frontend can further perform digital signature verification on message data of the received transaction information to ensure that the message of the request is from an authorized merchant and is not tampered with or forged. Then, only the transaction information passing the signature verification can be forwarded subsequently. Upon detecting that the acquired transaction data is tampered with or the acquired transaction data is in other abnormal conditions, the access frontend does not perform subsequent processing, and transmits the detected result information to the client to indicate that the currently transmitted data is not secure.

In S1200, identity information of the client sending the transaction information and a service type are acquired by parsing the transaction information that has passed the verification.

When the signature of the transaction data is verified by the access frontend, data of the current transaction information is considered to be secure. Therefore, the transaction information can be parsed to obtain the identity information of the client sending the transaction information as well as the service type. In this embodiment, the identity information of the client can be extracted from an IP address at which the transaction information is sent and from related fields in the header of a data frame in the information, while the service type can be acquired from a text data frame characterizing content among the transmitted data frame.

In S1300, matching is performed in an identity authority list based on the parsed identity information and the service type for authentication.

When the identity information of the client and the service type are parsed out, the client is authenticated based on the information. In the present disclosure, the authentication is mainly for identifying whether the client has the related authority to perform the related requested service. Therefore, in the present disclosure, an identity authority list is also stored in the access frontend. The identity authority list lists identity information and corresponding authority of one or more service types of all qualified clients. The identity information and the service type are one-by-one corresponded in the identity authority list, and therefore whether the client has the authority to initiate a data processing request of the service type is determined.

Further, when it is determined that the client does not have the relevant authority by authentication, exception information indicating authentication failure is sent to the client as a reminder. For example, in an embodiment, by parsing the transaction information from a client A, it is known that the service types that client A intends to process include service types B and C. In the identity authority list, the service types that can be processed by the client A include the service type C, excluding the service type B. Therefore, requests related to the service type C can be processed subsequently. For the service type B, exception information is sent to the client A to indicate that the client has no authority to process the service type B.

Further, a rule for determining whether the authentication succeeds or not can also be preset by the access frontend. For example, as described in the above embodiment, the client A has authority for one of the service type B and the service type C, but has no authority for the other service types. In this case, two rules can be set. One is that as long as any one of the service types meets the authority requirement, subsequent operations for the service are allowed to be performed. The other is that as long as the request of any one of the service types does not meet the authority requirement, none of the requests in the transaction information is responded to, and exception information is sent to the client such that the client can modify the transaction information. The specific rule may be set according to the actual situation.

In S1400, the transaction information that has passed the authentication is assigned to the transaction node.

When the transaction information passes the authentication using a predetermined rule, the relay server can assign the transaction information to the corresponding transaction node based on the identified location information.

In response to receiving the transaction information, the relay server provides a forwarding service for the transaction information, wherein a forwarding rule may be determined by analyzing the specific content of the transaction information, thereby ensuring that a same payment request message can be processed at a same node.

Figure 3:
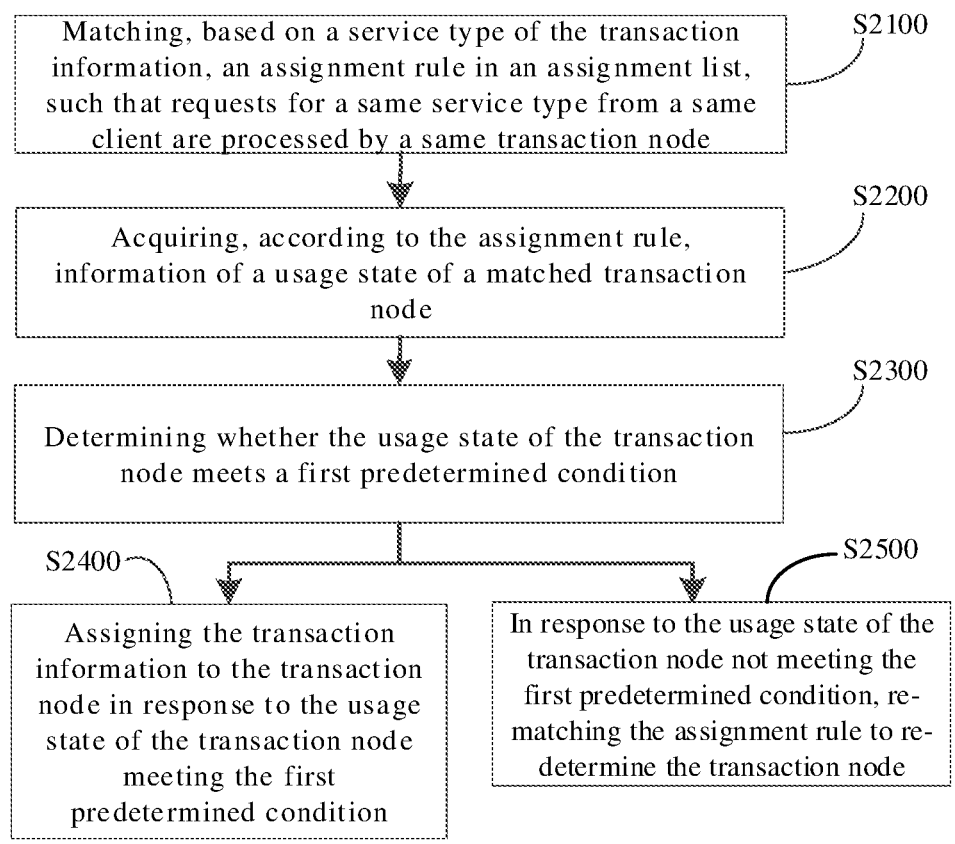
FIG. 3 is a flowchart of a method for assigning transaction information to a transaction node according to the present disclosure.

Further, in an embodiment, referring to FIG. 3, the process of assigning, based on the location information, the transaction information to the transaction node that has jurisdiction over the location information includes the following sub-processes.

In S2100, an assignment rule is matched in an assignment list based on a service type of the transaction information, such that requests for a same service type from a same client are processed by a same transaction node.

The assignment list is a mapping table between relevant information and corresponding assignment rules, wherein the relevant information includes identity information of clients sending the transaction information, and service types, and the like. The relay server assigns the transaction information based on the identified service type and location information of the transaction object.

The transaction object is a third-party payment platform that is identified based on the transaction information and needs to perform service processing, such as a bank end, a WeChat end, or an Alipay end. In an embodiment, the location information is location information of the client. Thus, when the service type is acquired, the transaction information is assigned to a transaction node with jurisdiction based on the location information of the client, such that the transaction information can be processed.

In another embodiment, the location information is location information of the transaction object of the transaction. For example, location information of the WeChat end and Alipay end disclosed above is China since WeChat and Alipay are both domestic payment platforms in China. Some of the bank ends may be in foreign countries. For example, Standard Chartered Bank, Citibank, and the like are foreign payment platforms. Transaction nodes are deployed based on server locations of these payment platforms. For example, transaction information, of which payment objects are the five largest domestic banks: Industrial and Commercial Bank of China, Agricultural Bank of China, Bank of China, China Construction Bank, and Bank of Communications, is set to be processed by a transaction node A. Transaction information corresponding to other domestic banks is set to be processed by a transaction node B. Transaction information corresponding to foreign banks is set to be processed by a transaction node C. Transaction information corresponding to non-bank third-party payment platforms, such as WeChat and Alipay, is set to be processed by a transaction node D. Thus, when the transaction object and the corresponding location information is parsed out from the transaction information sent by the client, the transaction information can be assigned based on the location information.

Further, the above classification is not completely limited. Since the transaction nodes are independent of each other, in order to ensure the normal processing of each piece of transaction information, the transaction information is assigned to nodes based on the transaction objects. In response to a problem occurring in one of the transaction nodes, the transaction information that should be processed by the problematic transaction node can be transferred to other transaction node according to a rule, such that the transaction information can be processed in time. The other transaction node to which the transaction information is transferred according to the rule herein may be a transaction node that processes the same type of transaction information as the original transaction node, or a transaction node configured with the same and available channel gateway.

Further, by identifying the service type and the identity information of the client, whether a plurality of pieces of transaction information belong to a same service is determined. In response to determining that the plurality of pieces of transaction information belong to the same service, all transaction information belonging to the same service is grouped into one transaction node for transaction processing.

Further, the relay server routes the transaction information to the corresponding transaction node by hashing (HASH). Hashing can transform an arbitrary-length input into a fixed-length output by using a hashing algorithm, wherein a value of the output is a hash value. In the present disclosure, hashing refers to routing the data message of the transaction information to the corresponding transaction node based on a specific hashing algorithm or rule. In this way, the security of the data during the matching process is ensured.

In S2200, information of a usage state of a matched transaction node is acquired according to the assignment rule.

When a corresponding transaction node is matched by process S2100, the transaction information is not directly assigned to the transaction node. Instead, the information of the usage state of the transaction node is acquired first. The information of the usage state is a current traffic ratio and operation parameters of the transaction node. By acquiring the traffic ratio, whether traffic ratio of the current transaction node exceeds a rating value is determined. When the traffic ratio exceeds the rating value, the current transaction node is oversaturated, which may affect the speed of transaction data processing. By identifying the operation parameters, whether the current transaction node is running normally and is available or not is determined. When the operation parameters are abnormal, the current transaction node is not available and the transaction data needs to be transferred.

In S2300, whether the usage state of the transaction node meets a first predetermined condition is determined.

The first predetermined condition is a standard reference condition set based on the usage state information. For example, when the detected usage state is the traffic ratio of the transaction node, the first predetermined condition is set as that the traffic ratio of the transaction node is not higher than 85%. When the detected traffic ratio of the current transaction node is 80%, the usage state of the current transaction node meets the first predetermined condition.

The description above is only one example of the usage state and the first predetermined condition in the present disclosure, and the usage state may be determined in other fashions in the present disclosure.

In S2400, the transaction information is assigned to the transaction node in response to the usage state of the transaction node meeting the first predetermined condition.

When it is determined that the transaction node meets the first preset condition, the transaction information is assigned to the corresponding transaction node based on the identified location information.

In S2500, the assignment rule is re-matched to re-determine the transaction node in response to the usage state of the transaction node not meeting the first predetermined condition.

When it is determined that the current usage state of the transaction node does not meet the first predetermined condition, the matching assignment rule is re-matched. The re-match of the assignment rule herein is performed in the same fashion as transferring the transaction information to other transaction node according to a rule in process S2100. The re-matched transaction node may be a transaction node that processes the same type of transaction information as the original transaction node, or a transaction node configured with the same and available channel gateway.

The way of identifying the usage state is in fact a traffic cutting method, which is implemented by the relay server. Since all types of transaction information messages are routed through the relay server to the corresponding nodes for processing, the configuration of a forwarding rule can be modified at the relay server to achieve traffic cutting of services.

Figure 4:
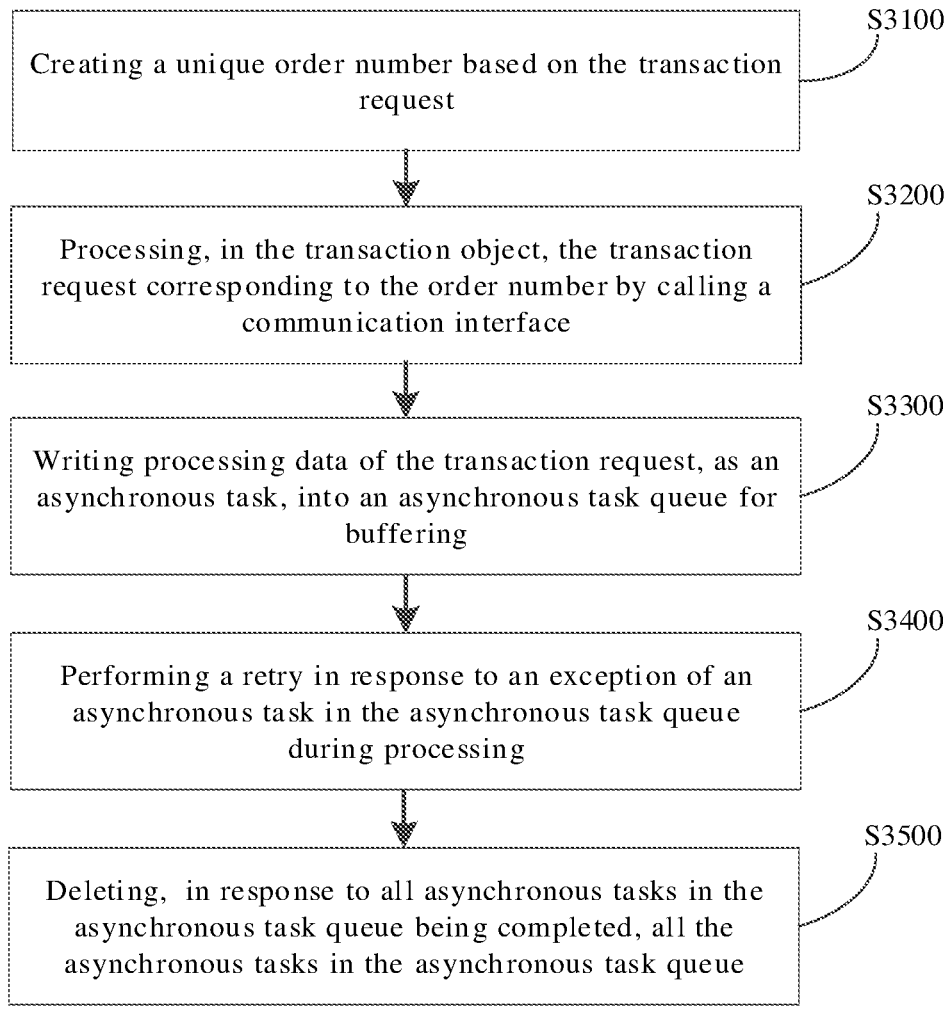
FIG. 4 is a flowchart of a method for processing the transaction request by a transaction object according to the present disclosure.

In response to receiving the transmitted transaction information, the transaction center processes the transaction information. In an embodiment, referring to FIG. 4, the method for processing the transaction request by the transaction object includes following sub-processes.

In S3100, a unique order number is created based on the transaction request.

In response to acquiring the transaction information, the transaction center needs to create a unique order number for the transaction information, to facilitate data processing and data monitoring. Since the identity information of the client, the service type, and the location information of the service object is identified in the foregoing service access layer, an order number can be generated based on the information and the service type according to a rule. Since the client with the same identity information may request the same service object to process a plurality of requests of a same service type, for differentiation, each transaction request in the transaction information may be matched with a unique order number according to a rule to facilitate data traceback.

In an embodiment, unique order numbers may be automatically generated based on a timeline. For example, starting with 0001, order numbers of transaction requests of transaction information received subsequently are 0002, 0003, and the like in order. Transaction information received at the same time may be randomly sequenced and order numbers may be sequenced for differentiation.

In another embodiment, the order number can be generated by embedding the identity information of the client, the service type and the transaction object information. For example, the order number is composed of the initials or ID that characterizes the identity information of the client, a serial number of the service type, a serial number of the transaction object, and a sequence number that is set based on the timeline. Orders with same client identity information, same service type, and same transaction object information can be distinguished according to the order number, thereby facilitating data query and traceback.

Further, in order to ensure the security of the order number, a randomly generated check code can be embedded into the order number to improve the security of the order.

Further, when the order is generated, the order number and the relevant data parsed out from the transaction information are stored in a database for retrieval at any time.

In S3200, the transaction request corresponding to the order number is processed in the transaction object by calling a communication interface.

A plurality of channel gateways are deployed in the transaction node. The scheduling interface between the transaction nodes and channel gateways is unified. Different channel gateways are docked to processing servers of different transaction objects. The channel gateway and the scheduling interface form a communication interface. When the order number is generated for the transaction information, a processing procedure of the corresponding transaction information can be acquired by monitoring the order number. The transaction center sends, through the communication interface, the transaction request in the transaction information to the server of the transaction object such that the transaction object processes the transaction request, and at the same time receives process information, such as a time point at which the transaction information is sent to the server of the transaction object, a process state of the transaction processing, a final result state, a total time spent, and the like.

In S3300, processing data of the transaction request is written, as an asynchronous task, into an asynchronous task queue for buffering.

In an embodiment, the transaction center writes the relevant processing data of the transaction acquired from the communication interface into the asynchronous task queue for buffering. A plurality of different work nodes are configured in a queue in the asynchronous task queue according to the processes of data processing. In response to receiving relevant data of each step, the information data is stored to a corresponding node, and therefore the current process and state of the processing can be determined.

In S3400, a retry is performed in response to an exception of an asynchronous task in the asynchronous task queue during processing.

Figure 5:
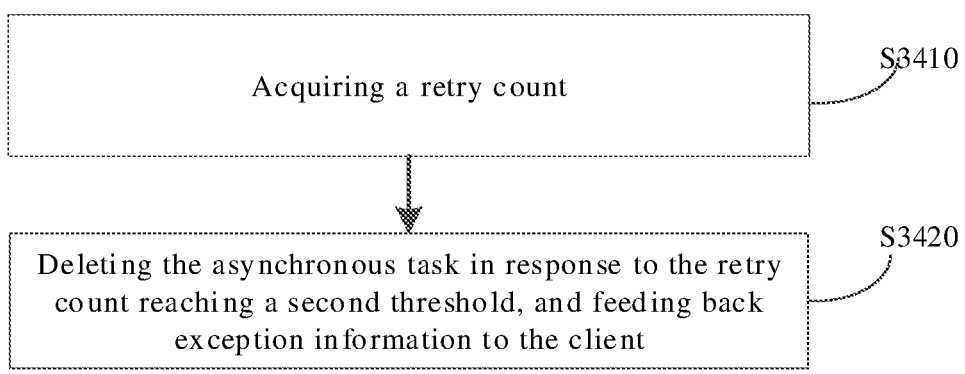
FIG. 5 is a flowchart of a retry method of an asynchronous task queue according to the present disclosure.

In an embodiment, when an exception occurs in any link in the asynchronous queue, the asynchronous task queue automatically sends information to the transaction node to prompt the transaction node to retry the link. Referring to FIG. 5, the process of retry includes the following sub-processes.

In S3410, a retry count is acquired.

In an embodiment, in order to save time and control the speed of processing, a maximum count value is set, which is called a second threshold. Therefore, when entering a retry, each time a retry operation is performed, the current count is recorded and compared with the second threshold.

When the exception is resolved by a retry or retries within the second threshold, subsequent asynchronous tasks in the asynchronous task queue is sequentially executed.

In S3420, the asynchronous task is deleted in response to the retry count reaching a second threshold, and exception information is fed back to the client.

When the retry count reaches the second threshold and the exception is still not resolved, information is sent to the transaction node such that the transaction node does not send any more retry tasks to request retries. At the same time, the asynchronous task is deleted, and the exception information is fed back to the client. The feedback information is also stored in the database.

In S3500, all asynchronous tasks in the asynchronous task queue is deleted upon completion of all the asynchronous tasks in the asynchronous task queue.

When the data exception is resolved upon a retry or retries, other asynchronous tasks in the asynchronous task queue are performed until all the asynchronous tasks are completed. Upon completion of all the asynchronous tasks in the asynchronous task queue, the current transaction information is completely processed. Then, all the asynchronous tasks in the asynchronous task queue is deleted, to release the data space.

Figure 6:
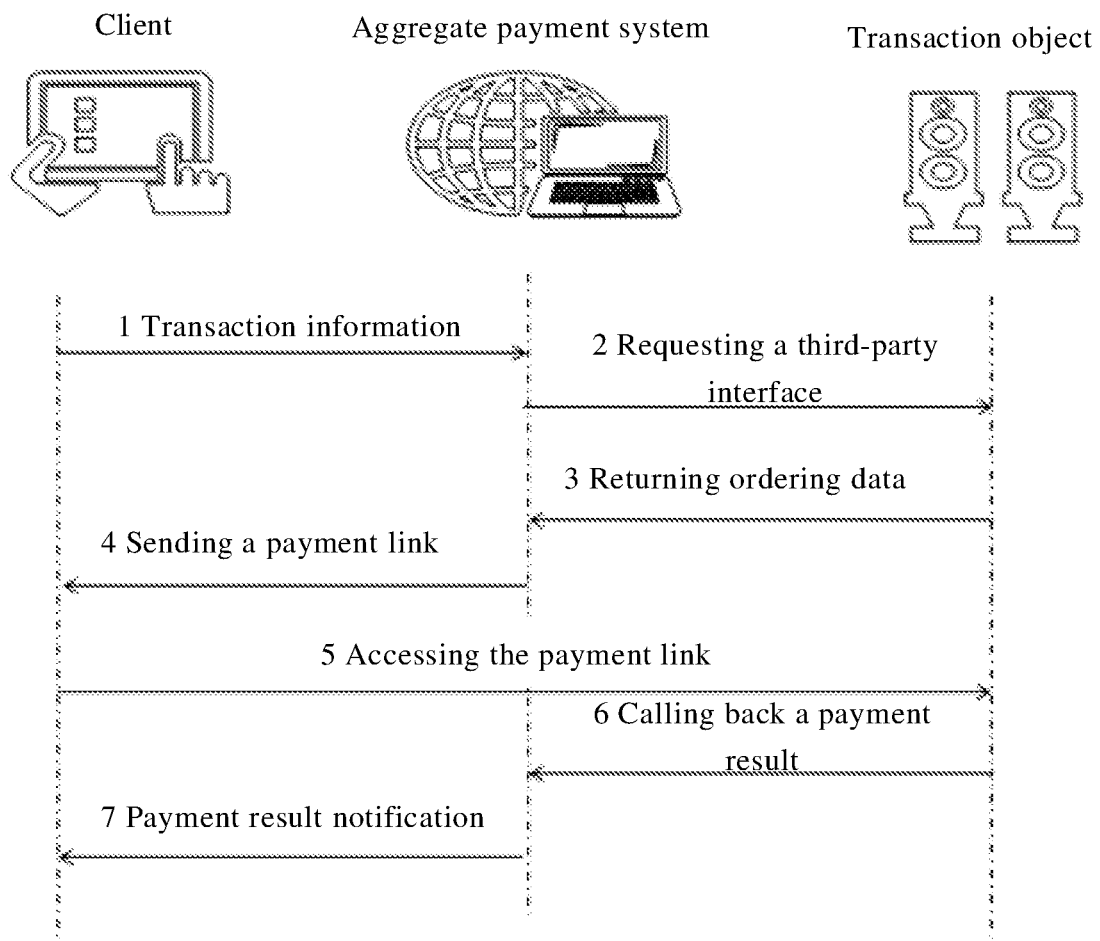
FIG. 6 is an overall flowchart of aggregate payment according to the present disclosure.

The foregoing method of the present disclosure forms an aggregate payment system. In a complete payment transaction request, as shown in FIG. 6, the client sends transaction information with a payment request to the aggregate payment system; the aggregate payment system communicates with a third-party transaction object through a communication interface; the third-party transaction object returns ordering data to the aggregate payment system; the aggregate payment system extracts a payment link based on the ordering data and sends the payment link to the client. The client accesses the payment link to complete payment. In response to acquiring a payment result, the third-party transaction object returns the callback payment result to the aggregate payment system. The aggregate payment system generates a payment result notification according to its own rule, and returns the notification to the client to indicate the payment result.

Figure 7:
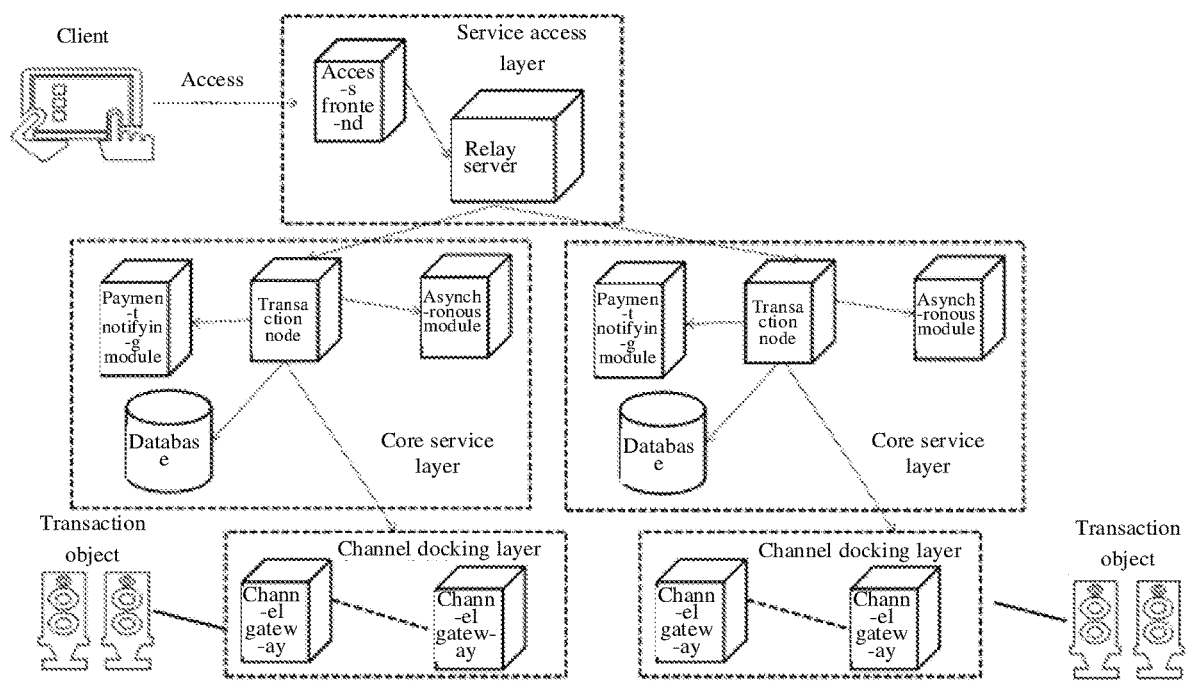
FIG. 7 is a schematic diagram of a multilayer structure of aggregate payment according to the present disclosure.

In an embodiment, as shown in FIG. 7, the aggregate payment system includes a service access layer, a core service layer, and a channel docking layer. The service access layer includes an access frontend and a relay server. The core service layer includes a transaction node. The transaction node includes a database for storing data, an asynchronous module for buffering an asynchronous task queue and performing retries, a payment notifying module for sending relevant data acquired in the transaction node to the client, and a payment monitoring module for monitoring data processing of the entire transaction node. The transaction node is connected, through a unified scheduling interface, to each channel gateway in the channel docking layer, so as to connect to different transaction payment platforms for transaction processing according to different third-party transaction objects.

Specifically, the backend architecture system for aggregate payment in the present disclosure includes:
 an access frontend, configured to acquire transaction information from a client, wherein the transaction information includes location information of a transaction object to which the transaction information is directed;
 a relay server, configured to assign, based on the location information, the transaction information to a transaction node that has jurisdiction over the location information, wherein the transaction node is a transaction center within a specified region in a distributed transaction system; and a transaction node, configured to send, based on a communication interface pre-established between the transaction node and the transaction object, a transaction request in the transaction information to the transaction object such that the transaction object processes the transaction request, acquire a processing result from the transaction object, and transmit information of the processing result to the client.

Optionally, the access frontend further includes:
a verifying module, configured to verify verification information of the transaction information, wherein the verification information is set using an encryption communication protocol;
a data parsing module, configured to acquire identity information of the client sending the transaction information and a service type by parsing the transaction information that has passed the verification;
an authenticating module, configured to match in an identity authority list based on the parsed identity information and the service type for authentication; and assign the transaction node to the transaction information that has passed the authentication.

Optionally, the access frontend further includes:
a traffic recognizing module, configured to acquire a traffic value of transaction information that has passed the authentication in a first predetermined time period; and
a selecting module, configured to allow assignment of transaction information of which the traffic value is less than or equal to a first predetermined threshold.

Optionally, the relay server includes:
an assignment rule matching module, configured to match, based on a service type of the transaction information, an assignment rule in an assignment list, such that requests for a same service type from a same client are processed by a same transaction node;
a state acquiring module, configured to acquire, according to the assignment rule, information of a usage state of a matched transaction node;
a determining module, configured to determine whether the usage state of the transaction node meets a first predetermined condition; and
an assigning module, configured to assign the transaction information to the transaction node in response to the usage state of the transaction node meeting the first predetermined condition.

Optionally, the relay server further includes a re-matching module, configured to re-match the assignment rule to re-determine the transaction node in response to the usage state of the transaction node not meeting the first predetermined condition.

Optionally, the transaction node includes:
an order generating module, configured to create a unique order number based on the transaction request;
a calling module, configured to process, in the transaction object, the transaction request corresponding to the order number by calling a communication interface;
an asynchronous module, configured to write processing data of the transaction request, as an asynchronous task, into an asynchronous task queue for buffering; and perform a retry in response to an exception of an asynchronous task in the asynchronous task queue during processing; and
a first deleting module, configured to delete, in response to all asynchronous tasks in the asynchronous task queue being completed, all the asynchronous tasks in the asynchronous task queue.

Optionally, the transaction node further includes:
a retry counting module, configured to acquire a retry count; and
a second deleting module, configured to delete the asynchronous task in response to the retry count reaching a second threshold, and feed back exception information to the client.

Figure 8:
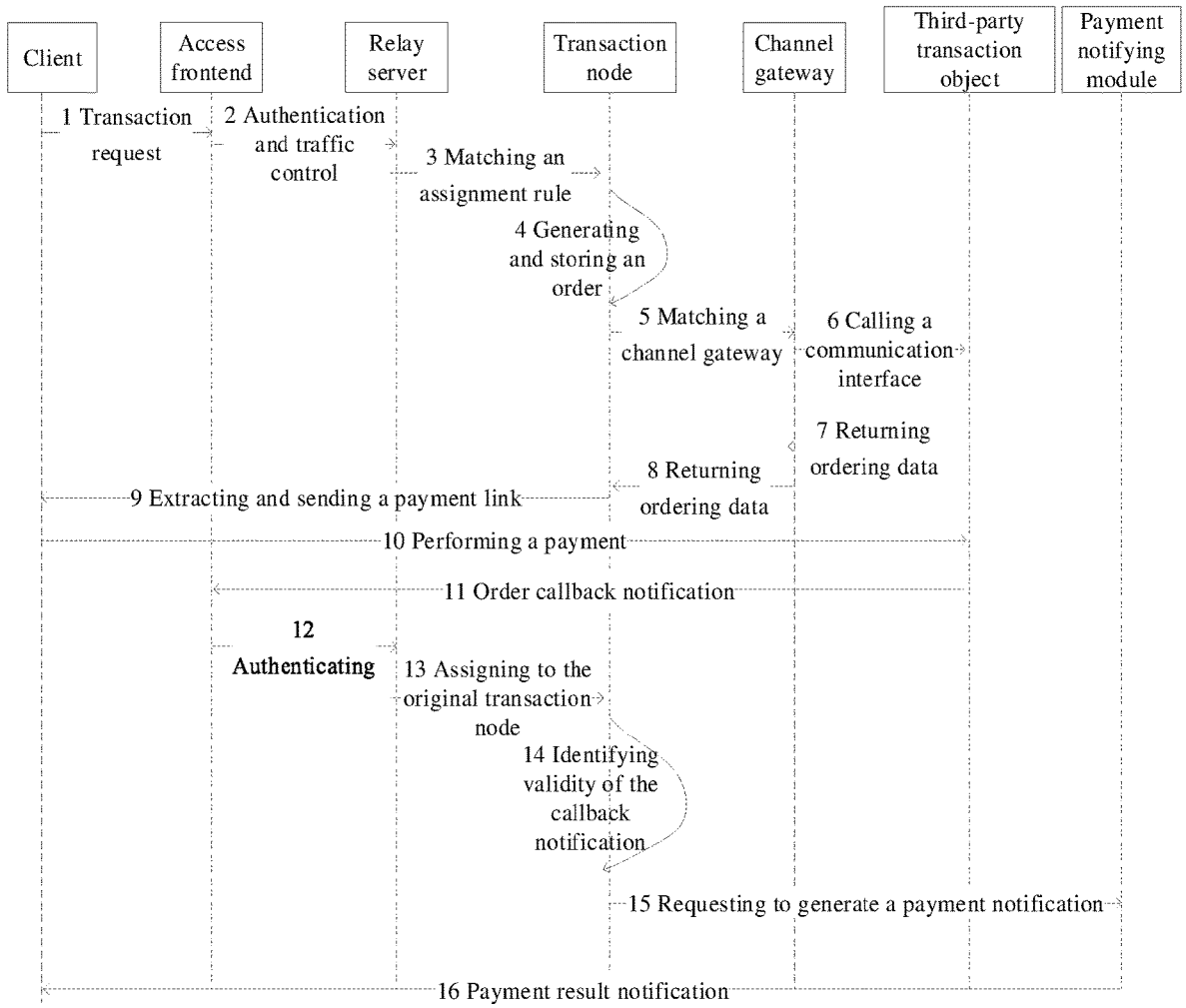
FIG. 8 is a flowchart of receiving information by modules of aggregate payment according to the present disclosure.

In an embodiment, as shown in FIG. 8, the specific working processes of the modules disclosed above are as follows: the client sends transaction information; the access frontend receives the transaction information, and sends the transaction information to the relay server upon authentication and traffic control; the relay server assigns the transaction information to a corresponding transaction node according to an assignment rule; in response to receiving the related transaction information, the transaction node creates an order number, and stores the related data in a database; at the same time, the transaction node calls a communication interface of a related channel gateway according to relevant information about the transaction object analyzed above; the channel gateway communicates with the third-party transaction object; the transaction object returns ordering data; the channel gateway receives the ordering data and transmits the ordering data to the transaction node; the transaction node extracts a payment link from the ordering data and sends the payment link to the client; the client accesses the payment link to perform a transaction payment directly; in response to determining that the transaction succeeds, the transaction object sends an order callback notification to the access frontend; when the access frontend authenticates relevant data, the relay server assigns, according to an assignment rule, the relevant data to the original transaction node; and the transaction node identifies the validity of the callback notification, and in response to the callback notification being identified as valid, the transaction node instructs the payment notifying module to generate a payment result notification, and constructs a data message to directly return the payment result notification to the corresponding client, to indicate the payment result.

Figure 9:
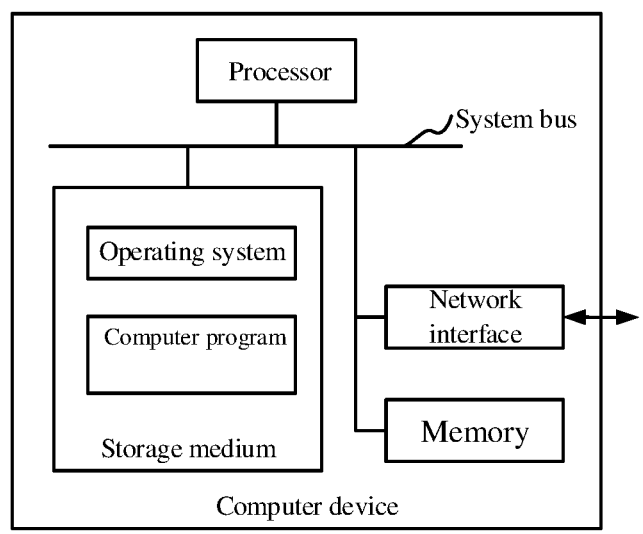
FIG. 9 is a block diagram of a basic structure of a computer device according to the present disclosure.

FIG. 9 shows a block diagram of a basic structure of a computer device according to an embodiment of the present disclosure.

The computer device includes a processor, a non-transitory storage medium, a memory, and a network interface, wherein the processor, the non-transitory storage medium, the memory, and the network interface are connected via a system bus. The non-transitory storage medium of the computer device stores an operating system, a database, and at least one computer-readable instruction. The database stores a control information sequence. The at least one computer-readable instruction, when executed by the processor, cause the processor to perform a backend architecture method for aggregate payment. The processor of the computer device is configured to provide computing and control capabilities, to support running of the entire computer device. The memory of the computer device may store at least one computer-readable instruction. The at least one computer-readable instruction, when executed by the processor, cause the processor to perform a backend architecture method for aggregate payment. The network interface of the computer device is configured to connect and communicate with a terminal.

The computer device receives status information of a prompt behavior from an associated client, i.e., whether the associated terminal turns on the prompt function and whether the user turns off the prompt task. By verifying whether the above task conditions are achieved, the computer device sends a corresponding predetermined instruction to the associated terminal such that the associated terminal can perform a corresponding operation according to the predetermined instruction, thereby achieving effective supervision over the associated terminal. At the same time, when the status of the prompt information is different from a predetermined status instruction, the server side controls the associated terminal to continuously ring, to prevent the prompt task of the associated terminal from being automatically terminated after being executed for a period of time.

The present disclosure further provides a storage medium storing at least one computer-readable instruction. The at least one computer-readable instruction, when executed by one or more processors, causes the one or more processors to perform the backend architecture method for aggregate payment described in any of the foregoing embodiments.

What is claimed is:

1. A method for an aggregating payment method for merchants, comprising:
   providing a computerized aggregate payment architecture for carrying out the method, wherein the method provides an aggregated plurality of payment channels between the merchants and third-party payers comprising a unified interface for processing customer payment transactions, wherein the payment architecture is in electronic communication with a plurality of third-party payers, each comprising a transaction object;
   wherein the payment architecture comprises a multiple layer server/client configuration wherein the merchants comprise a plurality of client POS terminals in electronic communication with a server of the payment architecture;
   wherein the payment architecture comprises a back end for a plurality of third payment platforms established by the third-party payers and each providing a specific payment method or payment service type;
   wherein the payment architecture comprises at least three independent software service layers which are in communication with one another in the payment architecture, comprising:
      a first front end service access layer comprising a relay server;
      a second core service layer comprising a plurality of servers, each comprising a plurality of transaction nodes, wherein the plurality of transaction nodes are distributed globally in various political regions around a world; and
      a third channel docking layer for providing a plurality of electronic channel gateways in communication with respective ones of the transaction objects, wherein each channel comprises a pre-established application interface with a respective one of the transaction objects;
   wherein the plurality of channels are connected to and in communication with the plurality of transaction nodes via a scheduling interface, wherein a specific channel is assigned to process a transaction in accordance with a specific transaction node, wherein the scheduling interface matches each channel with a specific third-party payer platform in accordance with an application protocol for that platform;
   wherein each channel is logically independent of every other channel and shielded from an upstream transaction node to maintain unified, consistent transaction processing despite changes to other channels;
   wherein the relay server of the payment architecture is configured to provide transaction node redundancy in processing a transaction, wherein if a specific transaction node is not available to transfer a transaction to a matched channel in the channel gateway, the relay server transfers the processing of the transaction to another transaction node based on a stored data structure comprising a mapping table and based on transaction node assignment rules;
   wherein the payment architecture executes the steps of the method as follows:
   acquiring, by the access frontend, transaction information from a client, wherein the transaction information comprises location information of the client or the location information of the server of a specific third-party payer which is the transaction object;
   assigning, by the relay server, based on the location information, the transaction information to a transaction node that has jurisdiction over payment transactions of the location information by: matching, based on a service type of the transaction information, an assignment rule in the mapping table, such that requests for the same service type from the same client are processed by the same transaction node,
   wherein the transaction node is deployed in the core service layer performing transaction service processing, and wherein the transaction node is classified as one of a plurality types of transaction nodes according to a location of a transaction object,
   wherein the transaction object is a third party payment platform, and wherein the transaction node is assigned according to whether the transaction object is a bank in a domestic country or a bank in a foreign country, or is a non-bank third party payment platform in a domestic country or a non-bank third party payment platform in a foreign country;
   acquiring, according to the assignment rule, information of a usage state of a matched transaction node, wherein the usage state comprises a predetermined transaction traffic ratio of the assigned transaction node;
   in response to the usage state of the transaction node meeting a first predetermined condition, assigning, based on the location information, the transaction information to the transaction node that has jurisdiction over the location information;
   matching, according to the transaction node, a channel gateway in a channel docking layer that pre-establishes an electronic connection relationship via an application interface with the transaction node, and
   sending a transaction request in the transaction information to a transaction object over the matched channel gateway such that the transaction object processes the transaction request, wherein the transaction object is identified based on the transaction information, and wherein the channel gateway communicates with the transaction node by the scheduling interface, and the channel gateway and the scheduling interface form a communication interface,
   wherein the scheduling interface is configured to shield interaction details to enable a connection of the transaction node with different transaction objects through a unified scheduling interface and maintain a consistent transaction process for different transaction objects; and
   acquiring, by the transaction node, a processing result from the transaction object, and transmitting information of the processing result to the client,
   wherein the client is configured to maintain one set of processes for interacting with the aggregated payment architecture having different transaction nodes through the unified scheduling interface.

2. The method according to claim 1, wherein before assigning, by the relay server, based on the location information, the transaction information to the transaction node that has jurisdiction over the location information, the method further comprises:
  verifying verification information of the transaction information, wherein the verification information is set using an encryption communication protocol;
  acquiring identity information of the client sending the transaction information and the service type by parsing the transaction information that has passed the verification;
  matching in an identity authority list based on the acquired identity information and the service type for authentication; and
  assigning the transaction node to the transaction information that has passed the authentication.

3. The method according to claim 2, wherein before assigning the transaction node to the transaction information that has passed the authentication, the method further comprises:
  acquiring a traffic value of transaction information that has passed the authentication in a first predetermined time period; and
  allowing assignment of transaction information of which the traffic value is less than or equal to a first predetermined threshold.

4. The method according to claim 1, wherein in response to the usage state of the transaction node not meeting the first predetermined condition, the assignment rule is re-matched to re-determine the transaction node.

5. The method according to claim 1, wherein processing the transaction request by the transaction object comprises:
  creating a unique order number based on the transaction request;
  processing, in the transaction object, the transaction request corresponding to the order number by calling a communication interface;
  writing processing data of the transaction request, as an asynchronous task, into an asynchronous task queue for buffering;
  performing a retry in response to an exception of an asynchronous task in the asynchronous task queue during processing; and
  deleting, in response to all asynchronous tasks in the asynchronous task queue being completed, all the asynchronous tasks in the asynchronous task queue.

6. The method according to claim 5, further comprising:
  acquiring a retry count; and
  deleting the asynchronous task in response to the retry count reaching a second threshold, and feeding back exception information to the client.

7. A non-transitory storage medium storing at least one computer-readable instruction, wherein the at least one computer-readable instruction, when executed by one or more processors, causes the one or more processors to perform the aggregating payment method for merchants as defined in claim 1.

8. The non-transitory storage medium according to claim 7, wherein before assigning, based on the location information, the transaction information to the transaction node that has jurisdiction over the location information, the method further comprises:
  verifying verification information of the transaction information, wherein the verification information is set using an encryption communication protocol;
  acquiring identity information of the client sending the transaction information and the service type by parsing the transaction information that has passed the verification;
  matching in an identity authority list based on the acquired identity information and the service type for authentication; and
  assigning the transaction node to the transaction information that has passed the authentication.

9. The non-transitory storage medium according to claim 8, wherein before assigning the transaction node to the transaction information that has passed the authentication, the method further comprises:
  acquiring a traffic value of transaction information that has passed the authentication in a first predetermined time period; and
  allowing assignment of transaction information of which the traffic value is less than or equal to a first predetermined threshold.

10. The non-transitory storage medium according to claim 7, wherein in response to the usage state of the transaction node not meeting the first predetermined condition, the assignment rule is re-matched to re-determine the transaction node.

11. The non-transitory storage medium according to claim 7, wherein processing the transaction request by the transaction object comprises:
  creating a unique order number based on the transaction request;
  processing, in the transaction object, the transaction request corresponding to the order number by calling a communication interface;
  writing processing data of the transaction request, as an asynchronous task, into an asynchronous task queue for buffering;
  performing a retry in response to an exception of an asynchronous task in the asynchronous task queue during processing; and
  deleting, in response to all asynchronous tasks in the asynchronous task queue being completed, all the asynchronous tasks in the asynchronous task queue.

12. The non-transitory storage medium according to claim 11, wherein the method further comprises:
  acquiring a retry count; and
  deleting the asynchronous task in response to the retry count reaching a second threshold, and feeding back exception information to the client.

13. The method according to claim 1, wherein a first type of a transaction node includes a group of larger banks in the domestic country, a second type of transaction node includes a group of smaller banks in the domestic country, a third type of transaction node includes a group of banks in the foreign countries, a fourth type of transaction node includes non-bank third party payment platforms in the domestic countries, and a fifth type of transaction node includes non-bank third party payment platforms in the foreign countries.

14. A backend architecture system for aggregate payment, the system has a computerized aggregated payment architecture for carry out an aggregating payment method, and provides an aggregated plurality of payment channels between the merchants and third-party payers comprising a unified interface for processing customer payment transactions, wherein the system is in electronic communication with a plurality of third-party payers, each comprising a transaction object;

wherein the system comprises a multiple layer server/client configuration wherein the merchants comprise a plurality of client POS terminals in electronic communication with a server of the payment architecture;

wherein the system comprises a back end for a plurality of third payment platforms established by the third-party payers and each providing a specific payment method or payment service type;

wherein the system comprises at least three independent software service layers which are in communication with one another in the payment architecture, comprising:

a first front end service access layer comprising a relay server;

a second core service layer comprising a plurality of servers, each comprising a plurality of transaction nodes, wherein the plurality of transaction nodes are distributed globally in various political regions around a world; and a third channel docking layer for providing a plurality of electronic channel gateways in communication with respective ones of the transaction objects, wherein each channel comprises a pre-established application interface with a respective one of the transaction objects;

wherein the plurality of channels are connected to and in communication with the plurality of transaction nodes via a scheduling interface, wherein a specific channel is assigned to process a transaction in accordance with a specific transaction node, wherein the scheduling interface matches each channel with a specific third-party payer platform in accordance with an application protocol for that platform;

wherein each channel is logically independent of every other channel and shielded from an upstream transaction node to maintain unified, consistent transaction processing despite changes to other channels;

wherein the relay server of the system is configured to provide transaction node redundancy in processing a transaction, wherein if a specific transaction node is not available to transfer a the transaction to a matched channel in the channel gateway, the relay server transfers the processing of the transaction to another transaction node based on a stored data structure comprising a mapping table and based on transaction node assignment rules;

the system further comprising:

an access frontend, configured to acquire transaction information from a client, wherein the transaction information comprises location information of the client or the location information of the server of a specific third-party payer which is the transaction object;

the relay server is further configured to assign, based on the location information, the transaction information to a transaction node that has jurisdiction over the location information by: matching, based on a service type of the transaction information, an assignment rule in the mapping table, such that requests for a same service type from a same client are processed by a same transaction node; acquiring, according to the assignment rule, information of a usage state of a matched transaction node, wherein the usage state comprises a predetermined transaction traffic ratio of the assigned transaction node; in response to the usage state of the transaction node meeting a first predetermined condition, assigning, based on the location information, the transaction information to the transaction node that has jurisdiction over the location information, wherein the transaction node is a transaction center within a specified region in a distributed transaction system; and the transaction node is configured to match, according to the transaction node, a channel gateway in a channel docking layer that pre-establishes a connection relationship with the transaction node, send a transaction request in the transaction information to a transaction object over the matched channel gateway such that the transaction object processes the transaction request, acquire a processing result from the transaction object, and transmit information of the processing result to the client, and wherein the transaction node is classified as one of a plurality types of transaction nodes according to a location of a transaction object, wherein the transaction object is a third party payment platform, and wherein the transaction node is classified according to whether the transaction object is a bank in a domestic country or a bank in foreign countries, or is a non-bank third party payment platform in a domestic country or a non-bank third party payment platform in foreign countries, wherein the client is configured to maintain one set of processes for interacting with an aggregated payment architecture having different transaction nodes through a unified scheduling interface, and wherein the transaction object is identified based on the transaction information, and wherein the channel gateway communicates with the transaction node by a scheduling interface, and the channel gateway and the scheduling interface form a communication interface, wherein the scheduling interface is configured to shield interaction details to enable a connection of the transaction node with different transaction objects through the unified scheduling interface and maintain a consistent transaction process for different transaction objects.

15. A computer device, comprising a memory and a processor, wherein the computer device provides a computerized aggregate payment architecture, wherein the payment architecture provides an aggregated plurality of payment channels between the merchants and third-party payers comprising a unified interface for processing customer payment transactions, wherein the payment architecture is in electronic communication with a plurality of third-party payers, each comprising a transaction object;

wherein the payment architecture comprises a multiple layer server/client configuration wherein the merchants comprise a plurality of client POS terminals in electronic communication with a server of the payment architecture;

wherein the payment architecture comprises a back end for a plurality of third payment platforms established by the third-party payers and each providing a specific payment method or payment service type;

wherein the payment architecture comprises at least three independent software service layers which are in communication with one another in the payment architecture, comprising:

a first front end service access layer comprising a relay server;

a second core service layer comprising a plurality of servers, each comprising a plurality of transaction nodes, wherein the plurality of transaction nodes are distributed globally in various political regions around a world; and a third channel docking layer for providing a plurality of electronic channel gateways in communication with respective ones of the transaction objects, wherein each channel comprises a pre-established application interface with a respective one of the transaction objects;

wherein the plurality of channels are connected to and in communication with the plurality of transaction nodes via a scheduling interface, wherein a specific channel is assigned to process a transaction in accordance with a specific transaction node, wherein the scheduling interface matches each channel with a specific third-party payer platform in accordance with an application protocol for that platform;

wherein each channel is logically independent of every other channel and shielded from an upstream transaction node to maintain unified, consistent transaction processing despite changes to other channels;

wherein the relay server of the payment architecture is configured to provide transaction node redundancy in processing a transaction, wherein if a specific transaction node is not available to transfer a the transaction to a matched channel in the channel gateway, the relay server transfers the processing of the transaction to another transaction node based on a stored data structure comprising a mapping table and based on transaction node assignment rules;

wherein the memory stores at least one computer-readable instruction, wherein the at least one computer-readable instruction, when executed by the processor, causes the processor to:

acquire transaction information from a client, wherein the transaction information comprises location information of the client or the location information of the server of a specific third-party payer which is the transaction object;

assign, based on the location information, the transaction information to a transaction node that has jurisdiction over the payment transaction of the location information by: matching, based on a service type of the transaction information, an assignment rule in the mapping table, such that requests for a same service type from a same client are processed by a same transaction node, and wherein the transaction node is deployed in the core service layer performing transaction service processing, and is classified as one of a plurality types of transaction nodes according to a location of a transaction object, wherein the transaction object is a third party payment platform, and wherein the transaction node is assigned according to whether the transaction object is a bank in a domestic country or a bank in foreign countries, or is a non-bank third party payment platform in a domestic country or a non-bank third party payment platform in a foreign country;

acquiring, according to the assignment rule, information of a usage state of a matched transaction node, wherein the usage state comprises a predetermined transaction traffic ratio of the assigned transaction node; in response to the usage state of the transaction node meeting a first predetermined condition, assigning, based on the location information, the transaction information to the transaction node that has jurisdiction over the location information;

match, according to the transaction node, a channel gateway in a channel docking layer that pre-establishes an electronic connection relationship via an application interface with the transaction node, and sending a transaction request in the transaction information to a transaction object over the matched channel gateway such that the transaction object processes the transaction request; and acquire a processing result from the transaction object, and transmitting information of the processing result to the client, wherein the transaction object is identified based on the transaction information, and wherein the channel gateway communicates with the transaction node by a scheduling interface, and the channel gateway and the scheduling interface form a communication interface, wherein the scheduling interface is configured to shield interaction details to enable a connection of the transaction node with different transaction objects through a unified scheduling interface, and maintain a consistent transaction process for different transaction objects, and wherein the client is configured to maintain one set of processes for interacting with an aggregated payment architecture having different transaction nodes through the unified scheduling interface.

16. The computer device according to claim 15, wherein before assigning, based on the location information, the transaction information to the transaction node that has jurisdiction over the location information, the at least one computer-readable instruction, when executed by the processor, further causes the processor to:

verify verification information of the transaction information, wherein the verification information is set using an encryption communication protocol;

acquire identity information of the client sending the transaction information and the service type by parsing the transaction information that has passed the verification;

match in an identity authority list based on the acquired identity information and the service type for authentication; and assign the transaction node to the transaction information that has passed the authentication.

17. The computer device according to claim 16, wherein before assigning the transaction node to the transaction information that has passed the authentication, the at least one computer-readable instruction, when executed by the processor, further causes the processor to:

acquire a traffic value of transaction information that has passed the authentication in a first predetermined time period; and allow assignment of transaction information of which the traffic value is less than or equal to a first predetermined threshold.

18. The computer device according to claim 15, wherein in response to the usage state of the transaction node not meeting the first predetermined condition, the assignment rule is re-matched to re-determine the transaction node.

19. The computer device according to claim 15, wherein processing the transaction request by the transaction object comprises:

creating a unique order number based on the transaction request;

processing, in the transaction object, the transaction request corresponding to the order number by calling a communication interface;

writing processing data of the transaction request, as an asynchronous task, into an asynchronous task queue for buffering;

performing a retry in response to an exception of an asynchronous task in the asynchronous task queue during processing; and deleting, in response to all asynchronous tasks in the asynchronous task queue being completed, all the asynchronous tasks in the asynchronous task queue.

20. The computer device according to claim 19, wherein the at least one computer-readable instruction, when executed by the processor, further causes the processor to:

acquire a retry count; and delete the asynchronous task in response to the retry count reaching a second threshold, and feeding back exception information to the client.

* * * * *